United States Patent
Auer

(10) Patent No.: US 8,297,308 B2
(45) Date of Patent: Oct. 30, 2012

(54) CARTRIDGE

(75) Inventor: Robert Auer, Stadtbergen (DE)

(73) Assignee: Washtec Holding GmbH, Augsburg (DE)

( * ) Notice: Subject to any disclaimer, the term of this patent is extended or adjusted under 35 U.S.C. 154(b) by 835 days.

(21) Appl. No.: 12/300,164

(22) PCT Filed: May 9, 2007

(86) PCT No.: PCT/EP2007/054497
§ 371 (c)(1),
(2), (4) Date: Feb. 2, 2009

(87) PCT Pub. No.: WO2007/131924
PCT Pub. Date: Nov. 22, 2007

(65) Prior Publication Data
US 2009/0159140 A1    Jun. 25, 2009

(30) Foreign Application Priority Data
May 13, 2006    (DE) .................... 10 2006 022 477

(51) Int. Cl.
*F16K 37/00* (2006.01)
(52) U.S. Cl. .................................. 137/558; 222/55
(58) Field of Classification Search .............. 137/67, 137/558; 220/4.02, 3.2; 222/52–69
See application file for complete search history.

(56) References Cited

U.S. PATENT DOCUMENTS 3,989,391 A * 11/1976 Thorner .................. 401/43
5,178,009 A * 1/1993 Arekapudi et al. ........ 73/292

(Continued)

FOREIGN PATENT DOCUMENTS
DE    196 32 326    1/1998
(Continued)

OTHER PUBLICATIONS

International Search Report published on Nov. 22, 2007 for PCT/EP07/054497 filed May 9, 2007.
(Continued)

*Primary Examiner* — John K Fristoe, Jr.
*Assistant Examiner* — Matthew W Jellett
(74) *Attorney, Agent, or Firm* — Martin Fleit; Paul D. Bianco; Fleit Gibbons Gutman Bongini & Bianco PL

(57) ABSTRACT

The invention relates to a cartridge (1) for insertion into a receptacle of a motor vehicle handling facility having an interior chamber (2) which receives a liquid or pasty medium, an outlet (7), that can be opened so that the cartridge (1) can be used, and a data carrier (8) set up for touch-free electromagnetic signal transmission and positioned at a distance (5) to the interior chamber (2) of the cartridge (1) that is greater than a wall-thickness of the cartridge (1). Conventional cartridges of this kind are not sufficiently secure against confusion and resistant to outside influences. The task of making a cartridge available that cannot be confused, is reliable, space saving and resistant to outside influences, especially when in motor vehicle handling facilities, is solved by running an interior chamber floor (4) parallel and at a distance (5) to the floor of the cartridge (6) to which the data carrier (8) is allocated, or that the interior floor of the chamber (4) runs partially inclined to the floor of the cartridge (6) and the data carrier (8) is situated in the area of the greatest distance (11) between the interior floor of the chamber (4) and the cartridge floor (6).

20 Claims, 3 Drawing Sheets

U.S. PATENT DOCUMENTS

| | | | |
|---|---|---|---|
| 5,456,289 A * | 10/1995 | Bergmann | 138/45 |
| 5,746,353 A * | 5/1998 | Cheok et al. | 222/132 |
| 6,096,132 A | 8/2000 | Kaiba et al. | |
| 6,640,820 B2 * | 11/2003 | Caldwell et al. | 134/95.1 |
| 7,265,673 B2 * | 9/2007 | Teller | 340/572.1 |
| 8,010,211 B2 * | 8/2011 | Hendrickson et al. | 700/1 |
| 2001/0018931 A1 * | 9/2001 | Ijiri et al. | 137/558 |
| 2002/0048621 A1 * | 4/2002 | Boyd et al. | 426/77 |
| 2002/0179125 A1 * | 12/2002 | Klos et al. | 134/36 |
| 2003/0006281 A1 * | 1/2003 | Thomas et al. | 235/385 |
| 2003/0095253 A1 | 5/2003 | Chow | |
| 2003/0210141 A1 | 11/2003 | Iacovino | |
| 2003/0215280 A1 | 11/2003 | Hatasa et al. | |
| 2004/0041709 A1 * | 3/2004 | Forster | 340/603 |
| 2005/0012766 A1 | 1/2005 | Fukano et al. | |
| 2005/0103799 A1 * | 5/2005 | Litterst et al. | 222/55 |
| 2005/0252930 A1 * | 11/2005 | Contadini et al. | 222/52 |
| 2006/0243740 A1 * | 11/2006 | Reynolds et al. | 222/52 |
| 2007/0229288 A1 * | 10/2007 | Ogrin et al. | 340/573.1 |
| 2009/0314542 A1 * | 12/2009 | Arocha-Ferrino et al. | 174/565 |
| 2009/0314798 A1 * | 12/2009 | Hovinen et al. | 222/23 |
| 2010/0206400 A2 * | 8/2010 | Winkler et al. | 137/486 |
| 2011/0108570 A1 * | 5/2011 | Jarisch et al. | 222/23 |

FOREIGN PATENT DOCUMENTS

| | | |
|---|---|---|
| DE | 198 54 862 | 6/1999 |
| DE | 19917229 A1 | 10/2000 |
| DE | 101 55 786 A1 | 5/2002 |
| EP | 00970811 A | 1/2000 |
| EP | 1 060 895 | 12/2000 |
| EP | 1 414 682 | 5/2004 |
| EP | 1 739 028 | 1/2007 |
| EP | 1 767 461 | 3/2007 |
| JP | 2000238254 A | 9/2000 |
| NL | 1 006 453 | 1/1999 |
| WO | WO 2007/006109 | 1/2007 |

OTHER PUBLICATIONS

International Preliminary Report on Patentability published Nov. 17, 2008 for PCT/EP07/054497 filed May 9, 2007.

Written Opinion of the International Search Authority published Nov. 13, 2008 for PCT/EP07/054497 filed Sep. 5, 2007.

English Translation of International Preliminary Report on Patentability published on Dec. 10, 2008 for PCT/EP2007/054497 filed May 9, 2007.

English Translation of Written Opinion of the International Search Authority published Dec. 4, 2008 for PCT/EP2007/054497 filed May 9, 2007.

* cited by examiner

CARTRIDGE

FIELD OF THE INVENTION

The invention relates to a cartridge for insertion into a receptacle of a motor vehicle handling facility.

BACKGROUND OF THE INVENTION

For known motor vehicle handling facilities, e.g., motor vehicle paint finishing facilities or motor vehicle washing facilities, the liquid or pasty mediums to be applied to a vehicle often are extracted from cartridges.

Thus, EP 1 414 682 B1 discloses a device for supplying a motor vehicle washing facility with different chemical additives, which are filled in cartridges and can be continuously extracted from these as needed. The cartridges are differentiated from each other by means of special design, just as the receptacles are correspondingly differentiated. This permits flange-mounting of a cartridge only to a receptacle adapted to the design of said cartridge. This reliably rules out a confusing of additives. A disadvantage here is that a specifically adapted differently shaped cartridge must be manufactured for each receptacle. This necessitates, for each cartridge shape, a specific expensive manufacturing tool, e.g., one special casting mold per cartridge shape.

Further known from the state of the art are cartridges provided with special identification means for automated identification of the cartridge contents. Thus, DE 196 32 326 C1 discloses an automobile paint line for which different paints are filled in small containers. Said small containers carry as an identifying feature a bar code that can be read automatically prior to opening the small container. In addition the control for the automobile paint line also can deliver, by means of the bar code, application data for control of the spray apparatus. Reading of the bar code is carried out optically by means of a bar code reader prior to opening the small containers, thus, before paint can contaminate the outside of the small container. A reliable reading of the bar code during discharge of the paint would not be possible here, since optically capturing the bar code cannot be ensured due to paint contamination or paint haze in the vicinity of the cartridge.

DE 198 54 862 A1 shows another packaging container provided with a data carrier, with said data carrier being mounted on the surface of the container wall in the area of a vertical running side wall of the container by means of a special particular mounting or separate protective device. The special particular mounting or separate protective device shown here serves to protect the data carrier from external mechanical or chemical impact.

US 2003/0095253 A1 also shows the use of a data carrier for a container, in particular a glass bottle. Here, the data carrier is used in order to identify whether the bottle has already been opened or damaged, with the specific arrangement of the transponder on the container having no further significance. Here, the bottle content is poured out by means of a conventional bottle neck.

EP 1 060 895 discloses the use of a data carrier for printing cartridges for ink-jet printers, with the data carrier being arranged here on the vertical outside surface of the cylinder of the printing cartridge, such that it can be easily damaged from the outside as the exchangeable printing cartridge is grasped.

SUMMARY OF THE INVENTION

The problem of the invention therefore is to make available a cartridge that cannot be confused, is reliable, and resistant to outside influences, especially for use of the cartridge in motor vehicle handling facilities, motor vehicle washing facilities in particular.

This problem is solved by means of a cartridge for insertion into a receptacle of a motor vehicle handling facility in accordance with the disclosure. Advantageous configurations and expedient improvements in accordance with the disclosure will be readily apparent as described herein.

A cartridge according to the invention for insertion into a receptacle of a motor vehicle handling facility features a data carrier set up for touch-free electromagnetic signal transmission and positioned on the cartridge at a distance to the interior chamber that is greater than a wall-thickness of the cartridge, with an interior chamber floor running parallel and at a distance to the cartridge floor to which the data carrier is allocated, or with the interior chamber floor running partially inclined to the cartridge floor and the data carrier situated in the area of the greater distance between the interior chamber floor and the cartridge floor. Here, the distance is selected to be great enough to secure an electromagnetic signal transmission between the data carrier and an electromagnetic receiving and transmitting unit of the control unit of the motor vehicle washing facility arranged on the receptacle; thus, at the most, insignificant influences can appear. If the data carrier is allocated to a cartridge floor running parallel and at a distance from the interior chamber floor, then the necessary distance between data carrier and the medium contained in the interior chamber can be secured in a simple space-saving way. If alternatively the interior floor of the chamber runs partially inclined to the cartridge floor and the data carrier is situated in the area of greater distance between the interior chamber floor and the cartridge floor, the area in the cartridge available for the interior space is particularly well utilized.

In a particularly advantageous configuration of the invention, the data carrier is a passive transponder, so that there is no need to provide the cartridge with its own power supply for the data carrier. Alternatively however, an active transponder also can be used, which is supplied with power by an integrated power supply unit.

In a particularly advantageous execution in terms of product engineering, the data carrier is arranged on the cartridge by means of a spacing element. This allows the data carrier to be mounted at any discretionary location of the cartridge, with the spacing element advantageously being able to be molded as part of the cartridge.

If the outlet is arranged in the area of least distance between the interior chamber floor and the cartridge floor, then it is particularly easy for the medium to flow out from the interior chamber of the cartridge, preventing waste of the medium.

A container inserted in the interior chamber of the cartridge enables a particularly protected accommodation of the liquid or pasty additive in the interior chamber of the cartridge.

An inlet in the cartridge advantageously permits the cartridge to be filled with said liquid or pasty additive. By the same token, an inlet permits a solid, e.g., powdered additive situated in the cartridge to be mixed in the cartridge by adding water, substantially lessening the weight of a cartridge not yet filled with water.

In order to be able to transmit the fill state of the additives to the control unit of the handling facility, an advantageous execution of the invention provides for a fill state sensor, which is arranged adjacent to the outlet.

BRIEF DESCRIPTION OF THE DRAWINGS

Additional features and advantages of the invention result from the following description of preferred embodiments with the aid of the drawings. Shown are.

DETAILED DESCRIPTION OF THE INVENTION

Figure 1:
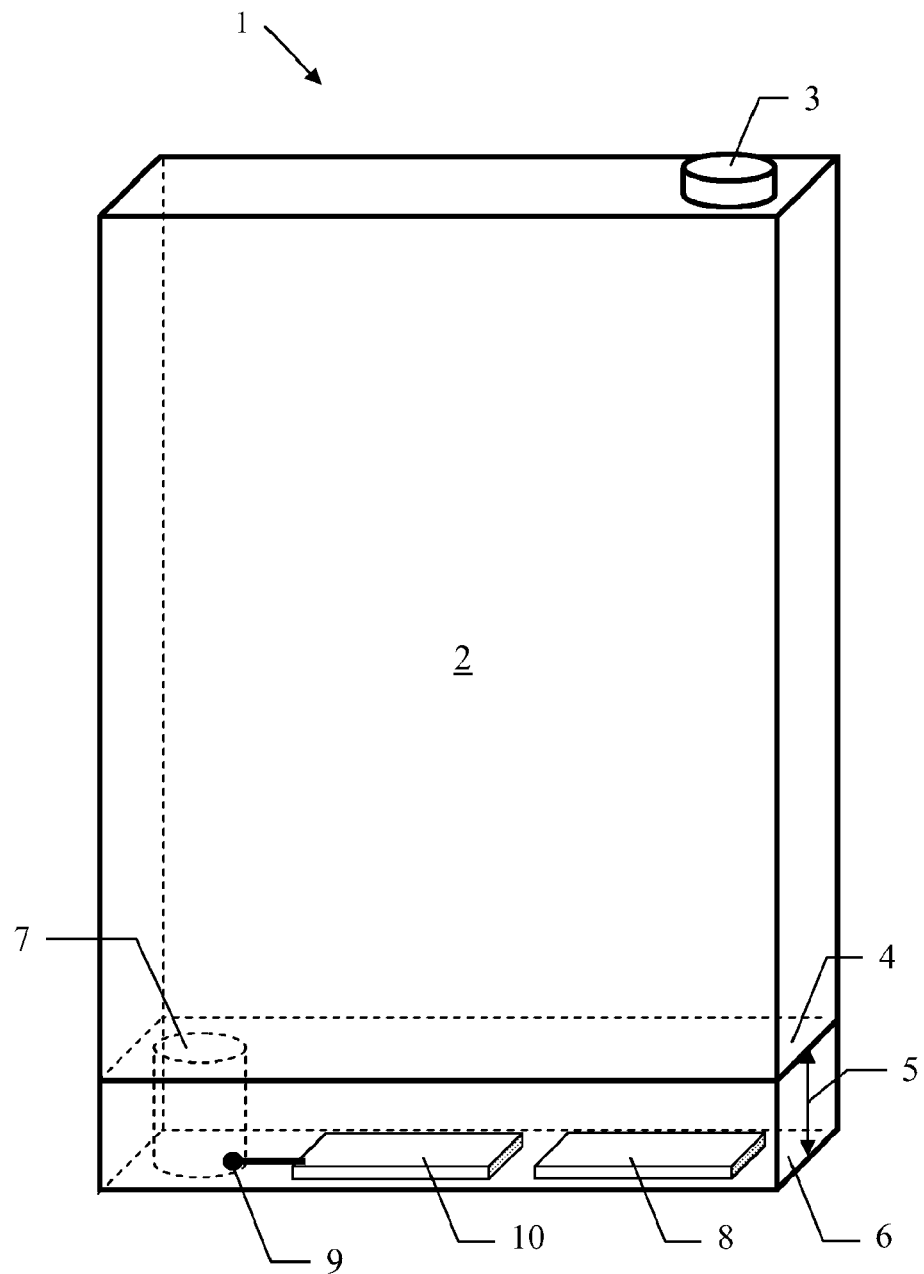
FIG. 1: a schematic perspective representation of a first embodiment of a cartridge according to the invention.

The cartridge (1) shown in FIG. 1 is composed of a hard plastic, with the walls of the cartridge (1) being of the same thickness throughout. The upper area of the cartridge in FIG. 1 features an interior chamber (2), which can be filled with a liquid or pasty medium, here a highly concentrated chemical additive. These media or additives can be a shampoo, drying agent, wax or wheel cleaner or a combination of said additives in highly concentrated liquid or pasty form. It also is possible, however, to fill a cartridge with additives in solid, e.g., powder, form and not to dissolve this until in the cartridge (1) by filling water in an inlet (3). In order to prevent deterioration of the additives during a long holding time of the cartridge (1) in the motor vehicle washing facility, the inlet (3) can be sealed in an airtight manner. The operator of a motor vehicle washing facility customarily procures cartridges already filled with additives in order to then insert these into a receptacle of a motor vehicle washing facility.

The receptacle, not shown here, of a motor vehicle washing facility includes at individual plug-in locations one or more electromagnetic receiving and transmitting units connected to a control unit of the motor vehicle washing facility.

The interior chamber (2) is defined by means of an interior chamber floor (4), which runs parallel, and at a distance (5) to the cartridge floor (6). Provided at one end of the interior chamber floor (4) is a cylindrical outlet (7) drawn with dashed lines in FIG. 1. The cartridge floor (6) seals the outlet (7) in order to prevent discharge of the additive prior to use. The outlet (7) is opened by means of a punch provided on the receptacle, whereby the cartridge floor (6) can feature a reduced wall thickness in this area in order to facilitate opening. Alternatively, the outlet (7) can be sealed by means of a manually removable cover or similar closure, with a thin membrane on the outlet (7) preventing discharge of the additive prior to use.

In an alternative embodiment of the cartridge not shown here, a compressible or fixed container, which is connected in a sealing manner to the outlet (7) and, if need be, to the inlet (3), is inserted in the inner chamber (1) [sic; (2)] to accommodate the additive.

Arranged on the cartridge floor (6) is a data carrier in the form of a passive transponder (8). Stored in the transponder (8) are data relating to the medium contained in the interior chamber (2), e.g., the type of medium, expiration date thereof, charge number, information for optimal dilution ratio with water, etc. Data stored in the transponder (8) can be read by the control unit of the motor vehicle washing facility by means of the electromagnetic receiving and transmitting units of the receptacle. For the passive transponder (8) present here, power transmission for operating the transponder (8) also occurs by means of the receiving and transmitting units. In order for power and data transmission, with the latter occurring in a high frequency manner, not to be impaired or even rendered impossible by means of the liquid or pasty medium contained in the interior chamber (2), the transponder (8) is arranged on the cartridge floor (6) at a sufficient distance from the interior chamber floor (4). In the present embodiment, this distance is a multiple of the wall thickness of the cartridge (1), wherein even a lesser distance would be sufficient. In order to be able to ensure a more secure data transmission to the transponder, said distance must, however, be greater than the usual wall thickness required for the stability and leak security of the cartridge (1). An unusually thick or only sporadic heightened swelling of the wall thickness of the cartridge (1), e.g., in the area of the interior chamber floor (4), would not represent a usual wall thickness of the cartridge (1) in the aforementioned sense.

Arranged in the outlet (7) is a fill state sensor (9), which is connected to an evaluation electronics (10). The evaluation electronics (10) is connected to the transponder (8) such that the fill state of the additive in the interior chamber (2) determined by means of the fill state sensor (9) likewise can be transmitted by means of the electromagnetic receiving and transmitting units to the control unit of the motor vehicle washing facility. Alternatively, the fill state sensor (9) can also be connected by means of a plug-in connection, provided at the receptacle, to the control unit of the motor vehicle washing facility. By the same token, it is possible to mount the fill state sensor (9) at another location, e.g., to the interior chamber floor (4).

The cartridge 1 shown in FIG. 2 corresponds in essence to that of FIG. 1, such that only the differences will be described in the following. Identical reference numbers are used for identical elements.

Figure 2:
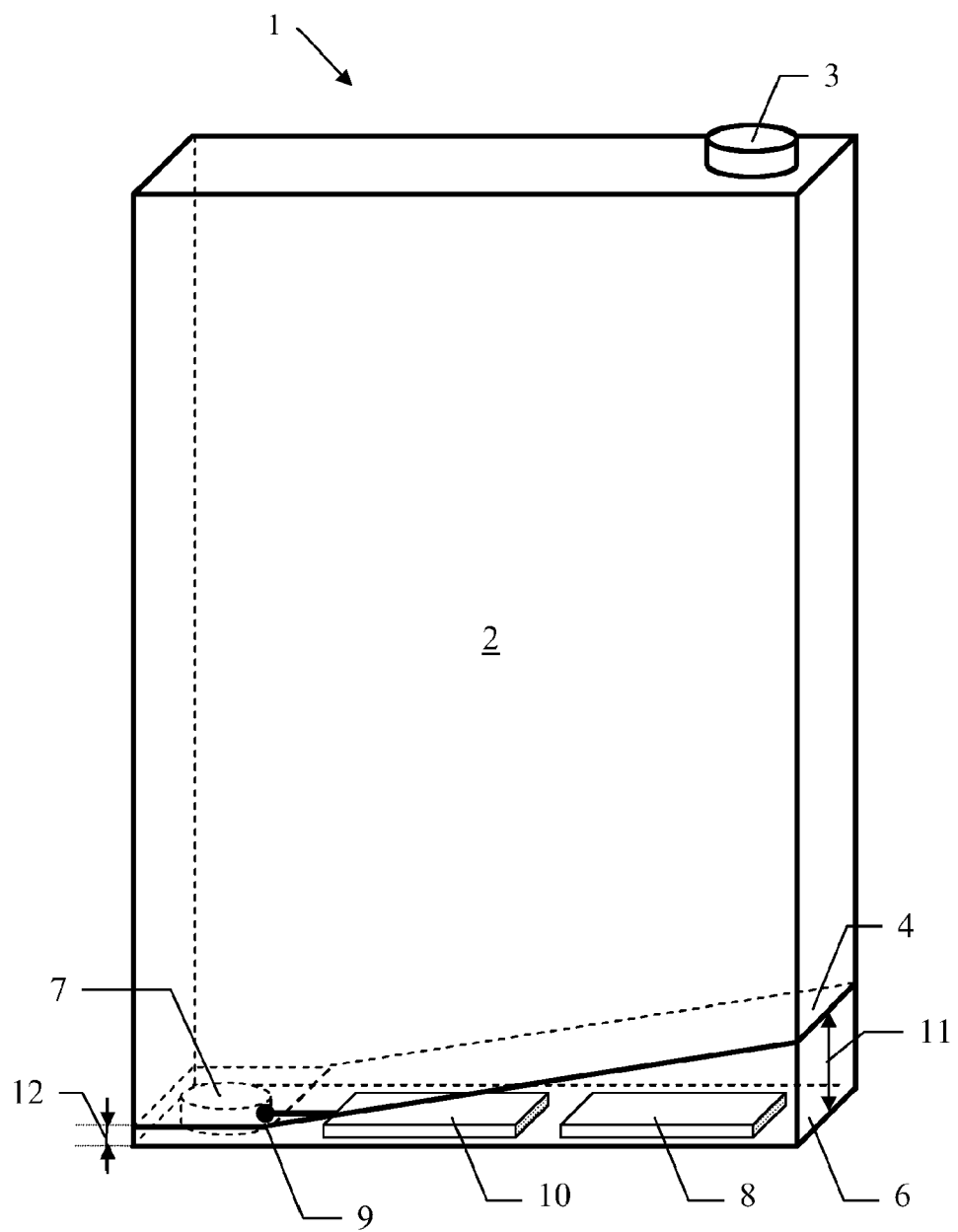
FIG. 2: a schematic perspective representation of a second embodiment of a cartridge according to the invention.

Here, the interior chamber floor (4), rather than running parallel to the cartridge floor (6), inclines from the greater distance (11) on the right side of the cartridge (1) in FIG. 2 to the cartridge floor (6) in the area of the outlet (7). Here, the outlet (7) likewise is of a cylindrical design, yet due to the smaller distance (12) between interior chamber floor (4) and cartridge floor (6) in the area of the outlet (7) is substantially shorter than that shown in FIG. 1. In order to prevent an interference to the electromagnetic transmission between transponder (8) and the receiving and transmitting unit in the receptacle caused by the additives, the transponder (8) is arranged between the inclined interior chamber floor (4) and cartridge floor (6) in the area of greater distance.

Figure 3:
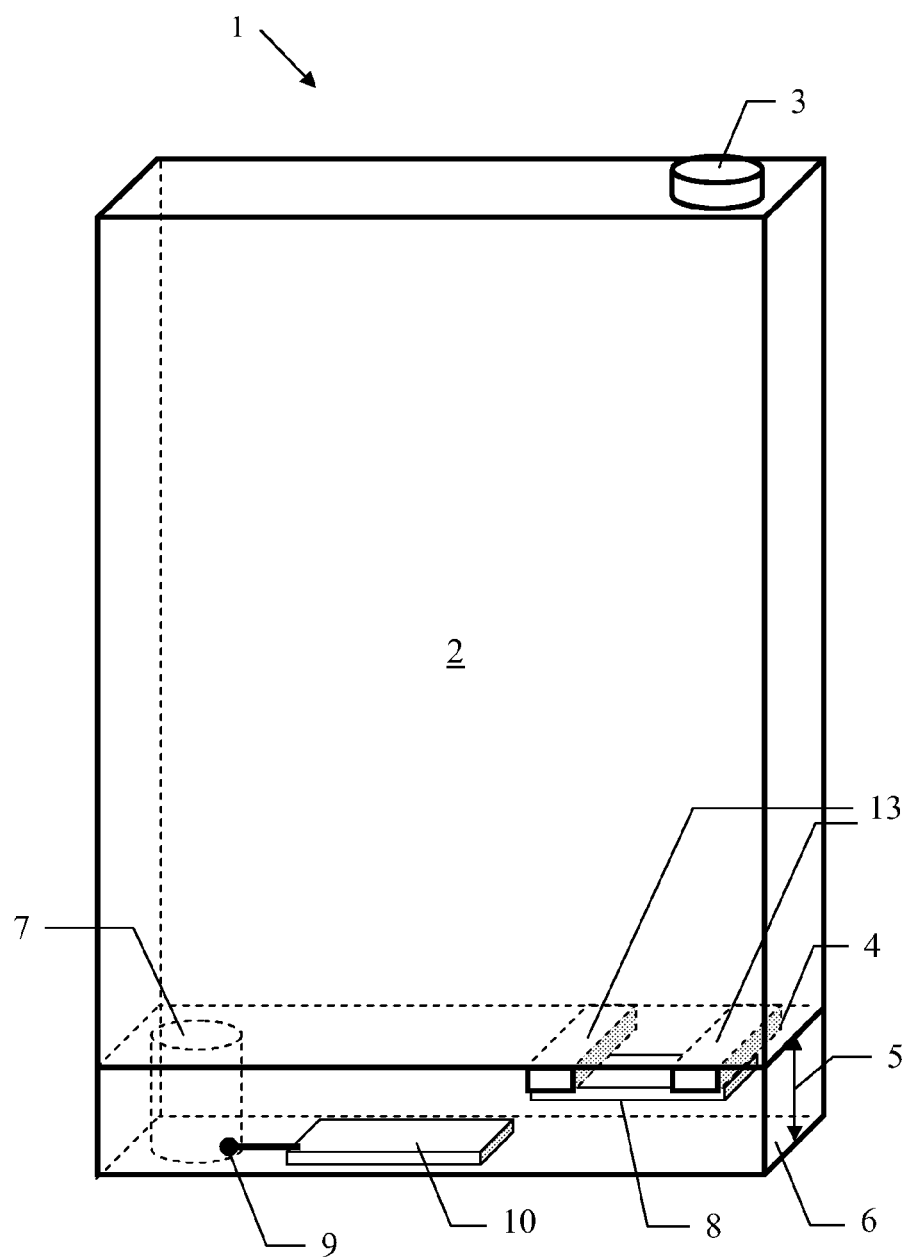
FIG. 3: a schematic perspective representation of a third embodiment of a cartridge according to the invention.

The embodiment represented in FIG. 3 differs from the embodiment according to FIG. 1 only by means of the arrangement of the transponder (8) on the cartridge (1). Here, the cartridge floor (6) was left out, so that the side walls of the cartridge (1) project beyond the interior chamber floor (4) in order to be able to engage in corresponding recesses of the receptacle. The transponder (8) is arranged on the interior chamber floor (4) of the cartridge (1), by means of two spacing elements designed as distancing pieces (13), ensuring the required distance from the liquid or pasty medium stored in the interior chamber (2). However, this also can occur by means of other spacing elements, e.g., by means of an increased wall thickness of the interior chamber floor (4) in this area. Provided that the spacing element is formed by means of a thickening or widening of the wall thickness of the interior chamber floor (4) or of the cartridge (1), this augmented wall thickness is not the usual wall thickness relevant to a dimensioning of the distance required for a secure function of the transponder (8). The spacing element ensures that the transponder (8) maintains the distance to the additive in the interior chamber (2) necessary for orderly operation.

Spacing elements also can be provided for the embodiment shown in FIG. 2.

The invention claimed is:
1. A cartridge for insertion into a receptacle comprising:
peripheral sidewalls and an interior chamber floor forming an interior chamber that receives a liquid or pasty medium, an outlet passing through the chamber floor and a cartridge floor that can be opened so that the cartridge can be used, and a data carrier provided in a data chamber sealed with respect to the interior chamber, the data carrier affixed to the cartridge within the data chamber to thereby be inserted and removed from the receptacle together with the cartridge, the data carrier configured for touch-free electromagnetic signal transmission with one or more electronic communication units associated with the receptacle and positioned at a distance to the interior chamber of the cartridge that is greater than a wall-thickness of the cartridge,
wherein the interior chamber floor runs parallel and at a distance to the cartridge floor to which the data carrier is affixed, or that the interior chamber floor runs partially inclined to the cartridge floor to which the data carrier is affixed,
wherein the receptacle is associated with a motor vehicle washing facility.

2. The cartridge according to claim 1, wherein the data carrier is a passive transponder.

3. The cartridge according to claim 1 wherein the data carrier is arranged on the cartridge by means of one or more spacing elements.

4. The cartridge according to claim 1 wherein the outlet is arranged in the area of lesser distance between interior chamber floor and cartridge floor.

5. The cartridge according to claim 1 wherein a container for accommodating the liquid or pasty medium is inserted in the interior chamber and is connected to the outlet.

6. The cartridge according to claim 1 wherein the cartridge features an inlet for filling the liquid or pasty medium in the interior chamber.

7. The cartridge according to claim 1 wherein a fill state sensor is provided adjacent to the outlet.

8. The cartridge according to claim 7, wherein the fill state sensor is connected to an evaluation electronics, the data carrier, or both.

9. The cartridge according to claim 1, wherein when the interior chamber floor runs partially inclined to the cartridge floor, the data carrier is situated in the area of greater distance between the interior chamber floor and the cartridge floor.

10. A cartridge for containing and releasing a flowable material, the cartridge releasably positionable within a receptacle, the cartridge comprising:
a cartridge body having a plurality of cartridge sidewalls including a cartridge floor;
a chamber floor within the cartridge body, the chamber floor and cartridge walls defining a holding chamber for holding the flowable material, the chamber floor, the cartridge walls, and the cartridge floor defining a data chamber, the holding chamber and the data chamber sealed with respect to each other such that the flowable material cannot pass from the holding chamber to the data chamber;
an outlet passing through the chamber and cartridge floors, the outlet configured to flow flowable material out of the holding chamber;
a sensor positioned within the cartridge within sensing proximity to the holding chamber for determining a state of the flowable material; and
a data carrier provided in the data chamber and connected to the sensor, the data carrier operative to communicate sensed data to the automated dispenser,
wherein the receptacle is associated with a motor vehicle washing facility.

11. The cartridge according to claim 10, wherein the data carrier is a passive transponder.

12. The cartridge according to claim 10, further comprising an evaluation electronic element provided in the data chamber and in communication with the data carrier and the sensor.

13. The cartridge according to claim 10, wherein the sensor is arranged adjacent to the outlet.

14. The cartridge according to claim 10, wherein the cartridge floor is substantially parallel to the compartment floor.

15. A motor vehicle service apparatus for applying a fluid or paste to a motor vehicle, the apparatus comprising:
a receptacle including a shaped recess and at least one electronic receiving unit;
a cartridge having a shape corresponding to the shaped recess of the receptacle, the cartridge receivable within the shaped recess of the receptacle and including peripheral walls,
an internal fluid chamber for holding the fluid or paste, the fluid chamber defined by the peripheral walls and including a chamber floor,
a data chamber within the cartridge and fluid sealed with respect to the internal fluid chamber, the walls of the data chamber defined by the walls of the cartridge and the chamber floor,
an outlet in fluid communication between the fluid chamber and the environment and passing through the chamber floor,
a sensor arranged within proximity to the internal fluid chamber for communicating data regarding a state of the fluid or paste, and
a transponder provided in the data chamber and connected to the sensor, the transponder configured to communicate with the at least one electronic receiving unit of the receptacle when the cartridge is received within the shaped receptacle;
wherein the receptacle is configured to regulate the administration of the concentrated fluid or paste based upon a communication from the transponder, and the receptacle is associated with the motor vehicle,
wherein the receptacle is associated with a motor vehicle washing facility.

16. The motor vehicle service apparatus according to claim 15, wherein the sensor is arranged adjacent to the outlet.

17. The motor vehicle service apparatus according to claim 15, further comprising an evaluation electronic element provided in the data chamber and in communication with the data carrier, the sensor, or both.

18. The motor vehicle service apparatus according to claim 15, wherein the cartridge walls have a substantially uniform thickness.

19. The motor vehicle service apparatus according to claim 15, wherein the fluid or paste is at least one of a cleaning solution.

20. The motor vehicle service apparatus according to claim 15, wherein the transponder in the data chamber is positioned a distance away from the chamber floor at least a thickness of the chamber floor.

* * * * *